Feb. 27, 1934.  C. E. URBAN  1,949,341
VACUUM TUBE TESTER
Filed May 10, 1932  3 Sheets-Sheet 1
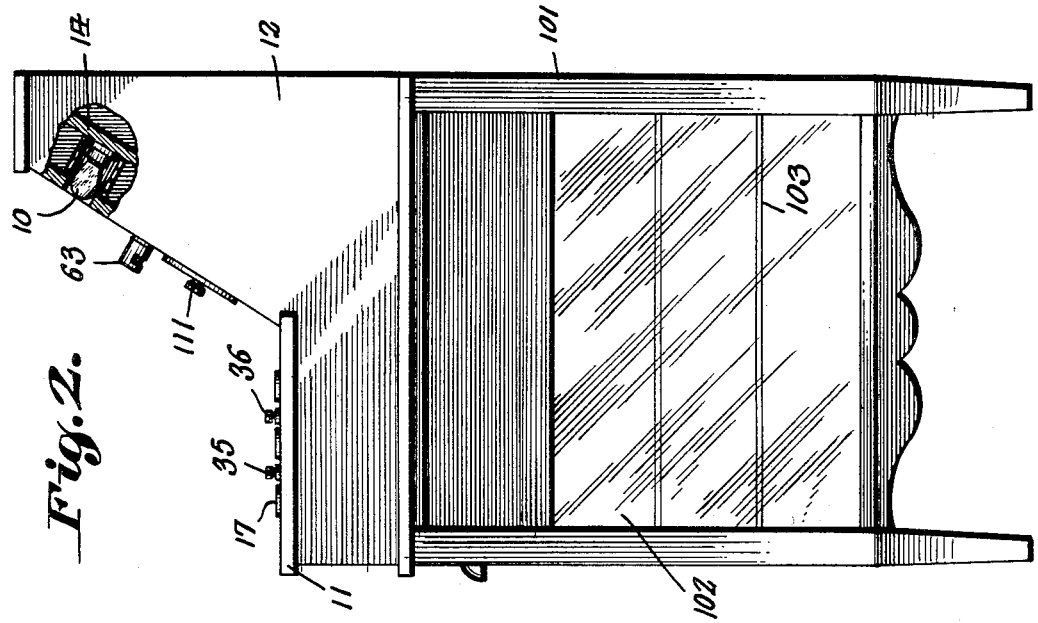
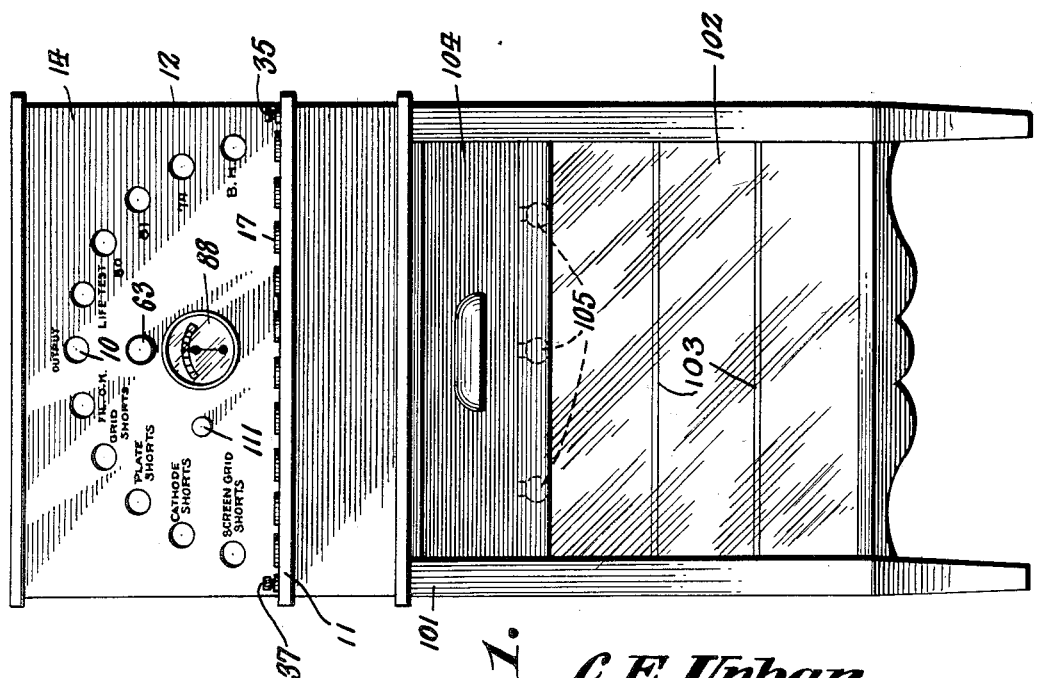
C. E. Urban, INVENTOR
BY Victor J. Evans & Co.
ATTORNEY Feb. 27, 1934.   C. E. URBAN   1,949,341
VACUUM TUBE TESTER
Filed May 10, 1932   3 Sheets-Sheet 2
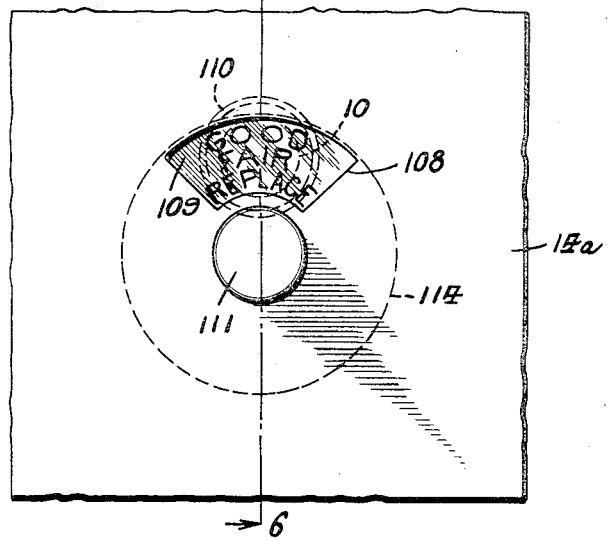
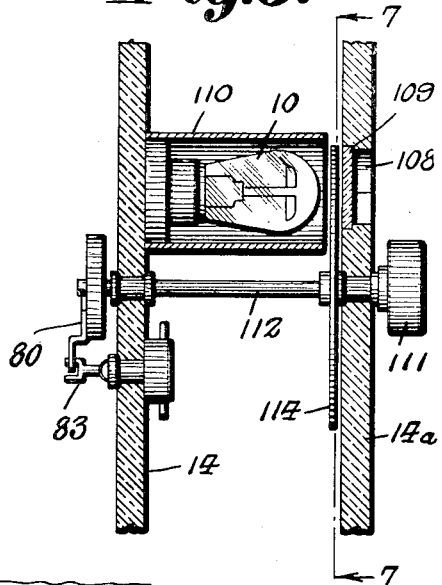
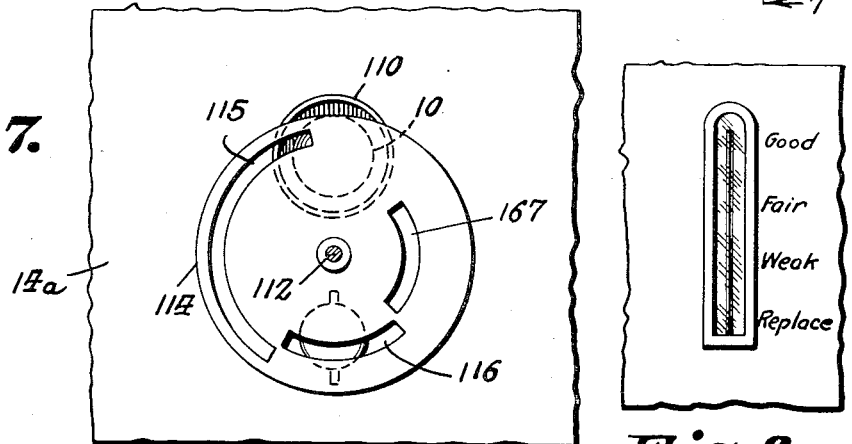
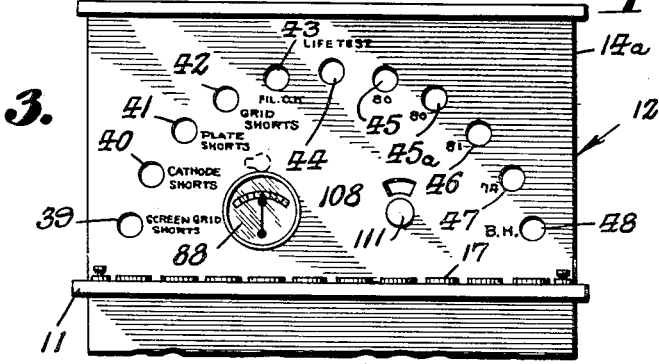
C. E. Urban, INVENTOR
BY Victor J. Evans & Co.
ATTORNEY Feb. 27, 1934.  C. E. URBAN  1,949,341
VACUUM TUBE TESTER
Filed May 10, 1932  3 Sheets-Sheet 3
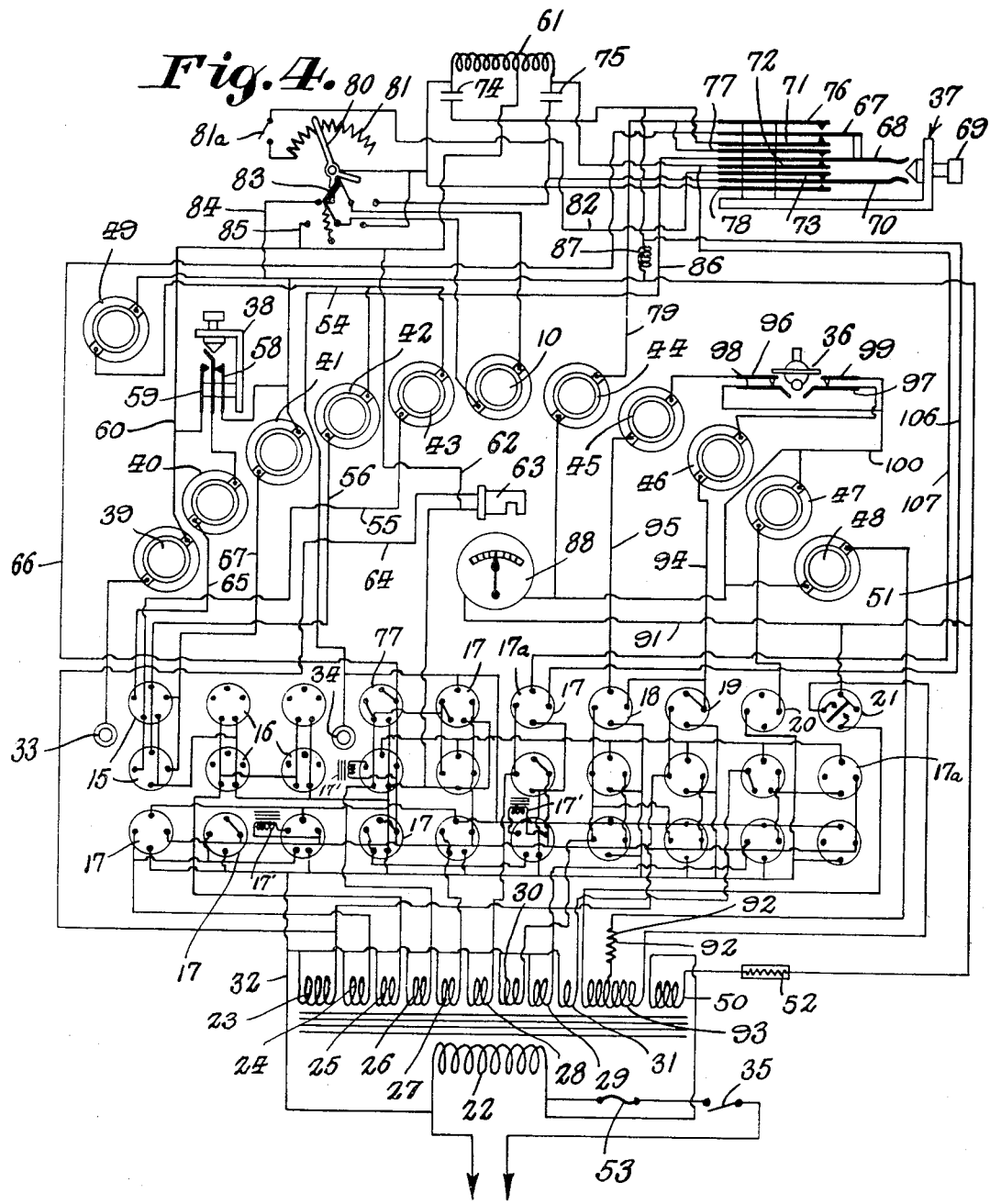
C.E. Urban,
INVENTOR
BY Victor J. Evans & Co.
ATTORNEY Patented Feb. 27, 1934

1,949,341

UNITED STATES PATENT OFFICE 1,949,341

VACUUM TUBE TESTER

Claude E. Urban, Bellevue, Pa., assignor to Casper J. Kauffman, Pittsburgh, Pa.

Application May 10, 1932. Serial No. 610,474

8 Claims. (Cl. 250—27)

The object of the invention is to provide a tester particularly adapted for use in merchandising radio tubes, so that the condition of the tubes may be readily indicated to the purchaser in terms which he can understand, as contradistinguished from the old plan of determining the condition by the mutual conductance as indicated by the change in plate current resulting from change in grid bias; to provide a tube tester adapted for various continuity tests to make possible visual indication of the continuity of the filament and similarly a visual indication of all existing internal shorts, such as a contact between cathode and heater or filament, a contact between plate and filament, or contact between plate and cathode; to provide a tester giving a visual indication of the condition of a rectifier, whether it be of the full wave or half wave type, or filament, gaseous or mercury vapor type; to provide means for comparing the conditions of a full wave rectifier at its two anodes; to provide apparatus which, while determining the condition of the tube, may also serve by means of a visual indicator to indicate the approximate life; and generally to provide apparatus of the kind indicated which, while capable of substantially all of the functions that might be expected in a tube testing machine, is of comparatively simple form and therefore susceptible of cheap manufacture and embodiment in portable form.

With this object in view, the invention consists in a construction and combination of parts of which a preferred embodiment is illustrated in the accompanying drawings but to which embodiment the invention is not to be restricted. Continued use in practice may dictate certain changes or alterations and the right is claimed to make any falling within the scope of the annexed claims.

In the drawings:

Figure 1 is a front elevational view of a tube testing apparatus embodying the invention.

Figure 2 is a side elevational view.

Figure 3 is a front elevational view with its supporting base or case omitted but showing a modified form.

Figure 4 is a diagrammatic view of the circuit layout of the invention.

Figure 5 is a front elevational view of the indicator employed in the quality test.

Figure 6 is a sectional view on the plane indicated by the line 6—6 of Figure 5.

Figure 7 is a sectional view on the plane indicated by the line 7—7 of Figure 6.

Figure 8 is a detail elevational view of a modified form of indicator employed in the quality test.

The invention contemplates the quality test or operative condition of a tube to be determined by its capacity to oscillate and to this end provides an oscillating circuit in which is included a visual indicator 10 in the form of a neon tube, the intensity of the luminosity of which or the extent of the area of whose electrodes glow is determined by the current flowing in the oscillating circuit.

The oscillating circuit is connected in across the grid and plate terminals of a plurality of tube sockets of which one is provided for each type of tube within the capacity of the apparatus, except where conditions permit the use of one socket for two or more types of tubes. The tube sockets are disposed on top of a deck 11 formed as the top of a case 12, the latter having an upwardly and rearwardly inclined panel 14 at the center of which and near the top is disposed the neon lamp 10. On the deck, the sockets 15, arranged near one end, are employed for continuity tests and for determining short circuits between the elements of the tube. The sockets 16 arranged adjacent to the sockets 15 constitute a bank of sockets for preliminarily heating the cathodes of the heater type of tube, so that when one tube is undergoing the oscillating test for quality, other tubes may be subjected to filament excitation to raise the temperature of the cathodes, so that there may be no need for waiting when those tubes are put to the oscillation test.

The sockets 17, of which there is one for each type of tube, except where a single socket may serve for more than one type, as "24", "35" and "51" types, which may be tested in the one socket, or the "00" and "01" types which may be tested in the same socket, are designed for the reception of tubes undergoing the oscillation test to determine their quality. The sockets 17ª at the one end of the deck are reserve sockets intended to be connected in the proper circuit when the range of the apparatus is extended to cover new types of tubes not yet on the market. The sockets 18, 19, 20 and 21 are respectively for emission tests of rectifier tubes of full wave filament type, half wave filament type, gaseous regulator type and full wave gaseous rectifier type and also mercury vapor rectifier type.

The filament circuits are excited from a transformer of which the primary 22 is designed for connection to a 110 volt alternating current supply line. The transformer is provided with a plurality of secondaries of which that indicated at 23 is wound for 7½ volts to excite the filaments of the "81", "10" and "50" types of tubes. The secondary 24 is wound for 2 volts for the filament of 2 volt tubes, the secondaries 25 and 26 are each wound for 2½ volts and one excites the filaments of tubes undergoing the oscillation tests while the other excites the filaments of tubes being preliminarily heated. The secondary 27 is wound for 6⅓ volts for tubes of that type of filament, while the secondaries 28, 29, 30, 31 are wound respectively for 3⅓ volts, 5 volts, 1½ volts and 3 volts for filament excitation of tubes having filaments of these voltages.

One terminal of each of the secondaries 23 to 31 inclusive is connected in on a common conductor 32 which is also connected in on one terminal of the primary 22. This conductor 32 is common to one filament terminal of all of the sockets on the socket deck except the socket 21. The other terminals of the secondaries run to the remaining terminals of the tube sockets, each to those sockets designed to receive tubes of the filament voltage of the secondary. It is unnecessary to a full understanding of the invention to trace out these circuits.

In testing a tube for oscillation, it is necessary to have grid and plate circuits in addition to the filament circuit but where the tube is of the type of four elements or more, certain of the socket terminals are cross-connected as the screen grid and plate in the "24" and "22" type of tube, and cathode and filament in the heater type of tube. Where sockets are employed for tubes of the pentode type, small iron core chokes 17' are preferably inserted in the cathode and plate connections. It is not essential to a full understanding of the invention, however, to recite in detail these cross connections, since the tube under test is converted into a triode during the test, whether it functions as a triode or not in use.

In the deck 11 are positioned the pin jacks 33 and 34, the former adjacent the sockets 15 and the latter between the sockets 16 and 17. These pin jacks are for the reception of pin plugs carried at the extremities of flexible conductors having clips for engaging the caps connected with the control grids of screen grid tubes, so that the control grid may be placed in circuit when the tube is undergoing the various tests of which the apparatus is capable.

There are also positioned in the deck the switches 35, 36, 37 and 38, the two former at the right hand end of the deck and the two latter at the left hand end with the switches 36 and 38 nearer the back.

On the panel 14, in addition to the neon lamp 10 are disposed the lamp sockets 39, 40, 41, 42, 43, 44, 45, 46, 47 and 48, all of these being the conventional lamp sockets for the reception of 110 volt lamps, preferably of the 10 watt size because of the small amount of current required thereby for illumination. Positioned within the case but behind the panel 14 is a lamp socket 49, this being also for the reception of the 10 watt 110 volt lamp.

The exciting transformer, in addition to the filament exciting secondaries, is also provided with a booster secondary 50 which is connected in series with the primary and from the remaining terminal of this booster secondary the high potential line 51 is run, a voltage regulator 52, of the resistance type, being serially included to maintain the voltage constant, since a 110 volt line is employed for plate excitation. By the use of the booster secondary 50, the 110 potential is raised to approximately 125 volts and then reduced to the value of approximately 110 volts by the voltage regulator 52 and maintained at that potential despite load changes.

The primary is controlled by means of the switch 35 and a safety fuse 53 is included in circuit.

The high potential side 51 of the plate excitation circuit is run to one terminal of the lamp socket 49 from the other terminal of which a conductor 54 is run to one terminal of the lamp 43 from whose other terminal the conductor 55 is run to the high potential binding posts of the filament circuits of the sockets 15. The socket 42 is also tapped in on the conductor 54, a conductor 56 running from the opposite terminal to the grid binding posts of the sockets 15. The socket 41 has one terminal connected in on the conductor 51 ahead of the socket 49 and the other terminal connected by a conductor 57 with the plate terminals of the sockets 15. The switch 38 is a single-throw double-pole switch of the leaf form, the leaf 58 being connected in ahead of the socket 41 and the leaf 59 connected in on a conductor 60 which runs from one terminal of the socket 39 to the midtap of the oscillator coil 61, the tap being taken off of the conductor 60, as indicated at 62, and run to the low potential side of the lamp 63 which is at the same potential as the low side 32 of the exciting circuit. The light 63 is excited from the transformer secondary 23, a conductor 64 being carried from the high side of this secondary to the high potential terminal of the lamp.

The center leaf which is the movable leaf of the switch 38 is connected to one terminal of the lamp 40 of which the other terminal is connected by means of a conductor 65 with the cathode terminal of the sockets 15. That terminal of the lamp 39 opposite that to which the conductor 60 is connected is connected with the pin jack 30.

All of the plate terminals of the sockets 17 are connected in on a conductor 66 which leads to the leaf 67 of the switch 37 which is a triple-pole double-throw switch of the jack switch form, the leaf 67 having a mechanical but electrically insulated connection with the leaf 68 which is actuated by the push 69, the push also actuating the leaf 70. The switch 37 is for the purpose of changing over from the oscillation test to the emission test and, when the oscillation test is being conducted as in the position shown in Figure 4 of the drawings, the leaf 67 electrically contacts with the leaf 71 and the leaf 68 similarly contacts with the leaf 72, the leaf 70 contacting with the leaf 73. One terminal of the oscillating coil connects with the leaf 72, while the other terminal connects with the leaf 71 but through a fixed condenser 74 of from .001 M. F. to .005 M. F. capacity. The leaf 70 connects with the same terminal of the coil 61 as that with which the leaf 72 connects but through a condenser 75 of .00025 M. F. The leaves 76, 77 and 78 are electrically engaged by the leaves 67, 68 and 70 in the shift-over position of the switch as when the button 69 is pressed. The leaves 76 and 77 are cross-connected and a common conductor 79 runs to one terminal of the lamp socket 44. The leaf 78 is connected to one terminal of the oscillating coil 61 between said terminal and the condenser 74 and a tap is taken off of this connection to movable arm 80 of a variable resistance of which the resistance element 81 is connected in on a conductor 82 leading to the leaf 73. The movable element 80 of the variable resistance is designed to operate a double-pole double-throw toggle switch 83 to the terminals of the movable element of which the neon lamp 10 is connected, the leaf 70 of the switch 37 being connected to one of the fixed terminals, as well as to the coil 61 through the condenser 75, and the movable arm of the resistance being connected to the complemental fixed terminal. The other fixed terminals of the switch are connected in, as indicated at 84 and 85, on the high potential side 51 of the plate excitation circuit and in on the conductor 60 which is common with the low potential side of said plate excitation circuit. If the switch be in the one position, the lamp 10 is connected across the 110 volt circuit because of the movable element of the switch engaging the terminals with which the conductors 84 and 85 are connected. In the other position of the switch, the neon lamp is connected across the oscillator coil 61 but in series with the condenser 75, any current flowing crossing the condenser to the leaf 70, thence to the leaf 73 and conductor 82 also to the toggle switch and thence to the lamp and back to the coil through the connection between the terminal and the condenser 74. The variable resistance, it will be noted, is connected in shunt with the lamp, so that the amount of resistance in circuit will determine the current flowing through the neon lamp, the latter receiving its greatest amount when the full resistance is in circuit and being reduced in infinitesimal decrements as the resistance is cut out by movement of the movable arm.

The conductor 86 common to the grid terminals of the tube sockets 17 is connected to the leaf 68, so that when it is engaged with the leaf 72, one terminal of the oscillator coil will be connected to the grid of the tube under test, just as the plate terminal of the tube will be connected to the opposite end of the oscillator coil through the condenser 74, by reason of the leaf 67 engaging the leaf 71.

Plate excitation current is carried from the source over the conductor 51 to the leaf 71 through a choke coil 87, this plate excitation current then passing to the leaf 67 and over the conductor 66 to the plate of the tube under test. The choke coil serves to confine the oscillator current to the oscillating circuit including the neon lamp.

In the shift-over position of the switch 37, when the button 69 is depressed, the leaves 67, 68 and 70 engage the leaves 76, 77 and 78. The grid and plate conductors 86 and 66 which are connected to the leaves 67 and 68 are then placed in parallel to convert the tube under test into a plain rectifier for indicating filament emission. The oscillator coil 61 is then short circuited to stop oscillation by reason of the leaf 70 engaging the leaf 78, the oscillator coil being connected to these two leaves. The neon lamp is also short circuited so that one of its electrodes will not glow by reason of the rectified plate current passing through it and thus confusing the filament emission test.

A meter 88 is positioned on the panel 14 and this meter is designed to read in terms of amperes, being preferably a 0–100 milliammeter. One side of the meter is connected in on the conductor 51 by means of a conductor 91, the other terminal being connected to that terminal of the lamp 44 opposite that to which the leaf 76 is connected. Similarly, this terminal of the meter is connected to one terminal of each of the lamps 47 and 48, the remaining terminal of the lamp 47 being connected to the plate terminal of the socket 20. The remaining terminal of the lamp 48 is connected through a resistance 92 with the midpoint of a high potential secondary 93 with which the transformer is provided. This secondary 93 is preferably of the order of 350 volts on a side and the terminals of the secondary are connected to the "F" terminals of the socket 21, this latter socket being for the reception of tubes of the gaseous rectifier type.

In the socket 19, the grid and plate terminals are cross-connected and a lead 94 runs from the plate terminal of this socket to one terminal of the socket 46, the plate terminal of the socket 18 being connected in on the lead 94. The grid terminal of the socket 18 is connected by means of a lead 95 with one terminal of the socket 45. The remaining terminals of the sockets 45 and 46 are connected one each to the leaves 96 and 97 of the toggle switch 36. The leaves 98 and 99 of said switch are cross-connected and connected in on the conductor 100 constituting the means by which the current passing through the meter reaches the lamps 45 to 48 inclusive.

The switch 36 is susceptible of three different positions, the intermediate position of the actuating member where the leaves 96 and 98 and 97 and 99 are respectively in engagement, a position to one side in which the leaf 97 is depressed to separate it from the leaf 99 and a second side position the reverse of the first where the leaf 98 is depressed from engagement with the leaf 96.

The case housing the various circuits above described may be set on a counter or other support but is preferably carried by a stand 101 provided with transparent panels 102 and shelves 103 on which may be placed any goods it is desired to have displayed. The case, just below the top, is provided with a drawer 104 in which tools or undisplayed goods may be carried and the shelf section below the drawer may be continuously illuminated as by means of lamps 105.

In the use of the invention, the normal positions of the switches 38 and 39 are as indicated in Figure 4 of the drawings, the switch 36 being susceptible of any one of the three positions above stated and switch 35 susceptible of being held in either open or closed position. The tube to be tested is first subjected to continuity tests, and the switch 35 having been closed, the primary 22 of the transformer is energized and provides a testing current of 110 volts for the continuity tests. Assuming the tube to be of the five prong type, it is placed in the upper of the two sockets 15 and if the filament be all right the lamp 43 will be illuminated, current passing from the primary 22 over the conductor 51 to the lamp in the socket 49, thence to the lamp in the socket 43 and over the conductor 55 to the filament terminal of the socket 15, thence through the filament of the lamp under test and thence to the low potential side 32 of the line and thence back to the source. If the filament be open, the lamp in the socket 43 will not light, indicating a broken circuit in the filament. The lamp in the socket 49 is not visible, being concealed within the case but this lamp acts as a voltage divider to reduce the current in the filament test circuit to approximately .05 of an ampere which is less than the filament current of the lowest amperage filament.

Illumination of the lamp in the socket 43 indicates filament continuity. If there be a grid short in the tube, that will be manifested by illumination of the lamp in the socket 42, for the current passing through the lamp in the socket 49 may then divide between the lamps in the sockets 42 and 43 and pass over the conductor 56 to the grid and across the short circuit to the filament and thence to the low potential side of the test line. If the tube under test be a screen grid tube, the lamp in the socket 42 will light on a short between the screen grid and the filament.

If a plate-filament short exists the lamp in the socket 41 will be illuminated, current passing from the conductor 51 to the lamp in the socket 41 and thence over the conductor 57 to the plate terminal, across the plate filament short and back to the source. If a cathode-filament short exists, current passes from the conductor 51 to the leaf 58 of the switch 38, thence to the lamp in the socket 40 and thence over the conductor 57 to the cathode terminal of the socket and across the short to the filament, returning to the source. Thus a grid-filament short, or a screen-grid-filament short in the case of the screen grid tube, a plate-filament short, or a cathode-filament short will be indicated by illumination of the lamps in the sockets 42, 41 or 40, so that the failure of these lamps to be illuminated will indicate that none of these shorts exists, while illumination of the lamp in the socket 43 is necessary to indicate continuity in the filament. If there be a cathode-grid short or a cathode screen-grid short, this will be determined after depression of the movable element of the switch 38 which will engage the center leaf with the leaf 59 and current will pass from the line 51 through the lamp in the socket 42 to the grid, or screen grid terminal, depending on the lamp under test, thence across the short to the cathode terminal and thence over the conductor 57 to the lamp in the socket 40 and to the leaf 59 and thence over the conductor 60 to the low potential side and back to the source.

A short on the control grid of a screen grid tube will be determined with the switch 38 in its normal position with the center leaf in engagement with the leaf 58. If the short be from plate to control grid, the lamps in the sockets 41 and 39 will be placed in series across the test line, current flowing from the conductor 51 to the lamp in the socket 41, thence over the conductor 57 to the plate terminal, across to the control grid, through the conductor connecting the control grid with the pin jack 33, thence through the lamp in the socket 39 and back over the conductor 60 to the low side 32 of the line. If a control-grid-cathode short exists, the lamps in the sockets 40 and 39 will be thrown in series across the test line, current passing from the conductor 51 to the leaf 58 and thence to the lamp in the socket 40, thence over the conductor 65 to the cathode terminal, thence across the cathode-control grid short and back to the source as before. If a control-grid screen-grid short exists, the lamps in the sockets 49, 42 and 39 will be thrown in series across the test line, current passing from the conductor 51 to the lamp in the socket 49, thence to the lamp in the socket 42, thence over the conductor 56 to the screen grid, thence across the short and thence to the pin jack and through the lamp in the socket 39 and back to the source as before.

If the lamp under test be the four prong lamp, the same indications will be given for the various shorts between elements with the omission of the test for cathode shorts, since no cathode independent of the heater exists in tubes of the four prong type.

A lamp under test having been found to have the filament intact and free from shorts between its elements is then subjected to the quality test for oscillation and is placed in its proper one of the sockets 17. The normal position of the switch 37 is that indicated in Figure 4 of the drawings and is the position of the parts for the oscillation tests. As above explained, the oscillator coil is then connected across the plate-grid terminals of the tube since, by reason of the position of the switch 37, it is connected to the conductor 66 and to the conductor 86, which lead to the plate and grid respectively of the tube under test. If in starting, the neon lamp is across the 110 volt circuit, the movable arm 80 of the variable resistor, first moving to the left, actuates the double-pole double-throw switch to connect the neon tube in the oscillating circuit and then continued movement of it all the way to the left reduces the amount of resistance across the neon lamp to a minimum. The resistance arm is then set for the limits of the particular tube being tested. If the tube is in good condition, it will oscillate and an oscillating current will be set up in the oscillator coil 61, illuminating the neon lamp. If the tube be good, the oscillating current derived from it will be sufficient to fully light both plates of the neon lamp. If it be only fair about one-half of the plates of the neon lamp will glow, while a poor tube will result in such a feeble alternating current that just very small portions of the plates will glow.

The oscillation test having determined that the tube is in good operative condition, it is next subjected to a life or emission test but this without changing its position in its proper socket 17. The emission test is carried out by changing position of the switch 37, depressing the movable element or button 69 to shift the leaves 70, 68 and 67. The change in position of the leaf 70 will engage it with the leaf 68, thus short circuiting and bringing the oscillating circuit to rest. The engagement of the leaves 68 and 67 with the leaves 77 and 76 respectively will result in connecting the conductors 86 and 66 in parallel, thus serving to cross-connect the plate and grid of the tube, so that it is converted into a plain rectifier, the emission of whose filament is determined by the luminosity of the lamp in the socket 44, current passing from the conductor 51 over the conductor 91, through the meter 88, through the lamp in the socket 44, over the conductor 79 to the leaf 76 and thence over the leaf 67 and conductor 66 to the plate. At the leaf 76 the current divides, part passing to the leaf 77 and thence to the leaf 68, flowing over the conductor 86 to the grid and from both to the filament and thence back to the low potential side 32 and then to the source. The luminosity of the lamp in the socket 44 will indicate the filament emission of the tube, as, for example, if the filament burns white it indicates high emission, while a yellow light will indicate good emission, orange, fair emission and red, low emission.

In addition to the emission test being indicated by the luminosity of the light in the socket 44, it is also indicated by the meter 88 which will indicate in volts on its scale the number of milliamperes flowing.

In tubes of the "99" and "20" types, the emission test is sometimes injurious and the oscillation test is therefore sufficient to determine the value of these tubes. The socket indicated at 17b is intended for the testing of these tubes and since they will not be subjected to an emission or life test, the plate and grid terminals of the socket 17ᵇ are connected by the conductors 106 and 107 in on the leaves 71 and 72 respectively of the switch 37. Thus the grid and plate terminals of this socket will not be connected in parallel in the switch-over for emission, as might inadvertently be done were this socket 17ᵇ not so connected in the circuit.

A full wave rectifier of the filament type, such as the "80" is tested in the socket 18 but is subjected to an emission test solely but this emission test is not dependent on any particular position of the switch 37, as that is solely for shifting from the oscillation to the emission test in tubes of three elements or more. A full wave rectifier placed in the socket 18 will, if the switch 36 be in neutral position, receive current through both anodes simultaneously, current passing from the conductor 51 over the conductor 91, through the meter 88 and over the conductor 100 to the leaves 99 and 98, where it divides, one part passing through the lamp in the socket 45 and the other part through the lamp in the socket 46 respectively to the two plate terminals of the socket 18 and thence to the filament and back to the source. The meter in this instance will read the combined amperage passing the two plates and the luminosity of the lamps in the sockets 45 and 46 will give visual indication of whether the two plates are passing equal parts of the current. If the emission to one plate is better than to the other, the lamp in circuit with that plate will be more brightly illuminated. Equal degrees of luminosity of the two lamps will show that two plates are passing equal divisions of the current, while differences of luminosity will show which is the better plate. If it is desired to read on the meter the current passed by each plate, the movable element of the switch 36 is shifted to first one side, when only one anode of the rectifier under test will be left under test and the current passed from that will be read on the meter. Similarly shifting the switch 36 to the other side will place the other anode in circuit when the current passed by it will be read from the meter.

If the tube under test be a half wave rectifier as the "81" type, it is placed in the socket 19 and the luminosity of the lamp in the socket 46 will then indicate its condition, current passing to the socket 19, just as it does to one of the anodes of the socket 18, since one plate of the latter socket is connected in common with the plate of the socket 19.
Regulator tubes of the gaseous type, such as the "74" type, are tested in the socket 20 and their condition indicated by the luminosity of the lamp in the socket 47, current passing from the conductor 51 over the conductor 91, through the meter 88, over the conductor 100 to the socket 47 and thence through the lamp in said socket to the anode of the tube in the socket 20 and thence from the cathode back to the source.

The full wave gaseous rectifier tube of the "BH" type is tested in socket 21 and its condition indicated by the luminosity of the lamp in the socket 48 which is in series with the cathode of this tube. With the tube placed in the socket 21 as shown diagrammatically in Figure 4, current will leave the secondary 93, passing to the two anodes, thence to the cathode and thence over the conductor 91, through the meter 88, to the socket 48 and through the lamp therein, and thence back through the resistor 92 to the midpoint of the secondary. The lamp in the socket 48 by illumination and the meter by the position of its indicator will then determine the condition of the tube.

In testing a screen grid tube both for oscillation and emission, the control grid is connected by means of a flexible conductor having a pin plug which, when inserted in the pin jack 34, connects the control grid in the grid circuit of the various sockets, the screen grid and plate terminals being cross-connected in the screen grid sockets to function as the plate elements in oscillation test.

In the continuity and short circuit tests above referred to, it is well to tap the tube under test, so that any intermittent short circuits that might give trouble with the tube in the set might be discovered as a result of the tapping. In some instances, the soldered connections between the filament and the prongs become loose, so that any vibration in a radio set might result in the filament being disconnected from the circuit of the set. Such intermittent loose connections in the filament will be apparent if the tube is tapped during the filament continuity test.

While the instrument is effective in determining the oscillating conditions of a tube from the intensity of the illumination of the neon lamp, as will be the case in instruments constructed in accordance with Figures 1 and 2, the instrument design may be extended to include the structure illustrated in Figures 3, 5, 6 and 7 in which case the life test lamp 44 is placed at the center of the panel and the lamp 45 duplicated by the addition of a second lamp 45ᵃ, the lamp 45 being in one anode circuit of the "80" type of tube socket and the other lamp 45ᵃ being in the other anode circuit and not in the common plate circuit of the "81" type of tube socket, as stated in the description of the diagrammatic view illustrated in Figure 4. The addition of the light 45ᵃ is made for the purpose of symmetry, since the neon tube 10 is transferred to a different position on the panel 14ᵃ, which is the front panel, it then occupying a position on one side and the meter 88 having a position on the other side. The panel 14ᵃ, where the instrument is constructed in accordance with the design of Figure 4, is formed with a window 108 in which is set a transparency 109, this transparency being set back from the front face of the panel 14ᵃ, so that the rays from exterior light sources may not shine on the transparency which is indited with the indicia "Good", "Fair" and "Replace", arranged in arcuate lines, one above the other. The neon lamp 10 is disposed directly behind the window and either has all of its surface but the end covered with an opaque coating, or else the lamp is housed in a tubular shield 110. This, so that when the lamp is lighted it may shine only through the transparency. The operating knob 111 is carried on a shaft 112 journaled in both the subpanel 14 and the front panel 14ᵃ and is connected with and moves the movable element 80 of the variable resistance. Likewise, this shaft supports and carries the opaque disk 114 which is formed with a series of arcuate slots as indicated at 115, 116 and 117, the slots being different radial distances from the center of the disk and the one having an angular lead over the other. The slot 115, when the disk is turned, registers with the word "Good", the slot 116 with the word "Fair" and the slot 117 with the word "Replace" but not more than one of the slots may register with its respective word at the same time and the disk serves to shield from the neon lamp all of the indicia on the transparency, except where one or the other words may show through its respective slot. As the knob 111 is turned from the left to the right, the slot 115 first registers with the word "Good" and if the tube under test is in good condition and will oscillate sufficiently to provide the necessary luminosity for the lamp 10 the word "Good" will be illuminated. If the luminosity is not sufficient to fully illuminate the elements of the lamp, the word "Good" will not be illuminated but the word "Fair" will be when the slot 116 registers with that word, provided the tube under test is in fair condition. If the luminosity produced by the tube is only sufficient to illuminate a slight area when the slot 117 registers with it the tube then is of little value and in fact may be in such poor condition that the neon tube may fail to light at all. Under such a condition, further shifting the resistance arm will actuate the double-pole double-throw switch to shift the neon tube across the 110 volt circuit which will establish in the neon tube a sufficient glow to illuminate the word "Replace".

By reason of the disk being connected for synchronous movement with the variable resistor, the resistance is placed in circuit as the disk progressively registers with the words "Good", "Fair" and "Replace". Thus, when the slot 115 is in registration with the word "Good" the minimum amount of resistance will be in circuit, so that the lamp will get the minimum amount of current that will be derived from the generating qualities of the lamp under test.

If the indicator employed be of the form shown in Figure 8, it will likewise have a limited resistance in shunt with it in the oscillating circuit and will be read in connection with the words "Good", "Fair", "Weak" and "Replace" engraved or indited on the panel immediately adjacent the vertical slot in the panel constituting the observation window. The height of the light in this tube will indicate the condition of the tube under test. Except for its form, the indicator shown in Figure 8 functions identically as does the indicator shown in Figures 5, 6 and 7.

A switch 81ª may be incorporated to cut out the resistance 81 when testing certain tubes, such as types "99", "22", "32" and "30".

The meter 88, instead of being the ammeter described, may be an improvised ammeter composed of a 10 volt voltmeter shunted with a 100 ohm resistance. In such a case the drop in voltage thus measured across the resistance will be the equivalent of milliamperes flowing. Where the tester is of the portable form for transportation to the home of a customer, if the meter incorporates the shunting resistance referred to, the latter is preferably provided with a switch, so that the resistance may be cut out to leave the voltmeter available for reading grid and cathode voltages. The resistance when in circuit, aside from converting the voltmeter into a direct reading milliammeter, also functions as a shunt to provide for the passage of sufficient current to light the lamp in the socket 44.

The invention having been described, what is claimed as new and useful is:

1. A vacuum tube tester comprising a plurality of sockets for tubes of different electrical characteristics, plate and filament excitation circuits connected to said sockets, an oscillating circuit connected across the plate and grid circuits of said sockets, a visual indicator consisting of a neon lamp connected in series with the capacity across said oscillating circuit, and means for varying the current flowing through the neon lamp consisting of a variable resistance shunting the neon lamp.

2. A vacuum tube tester comprising a plurality of sockets for tubes of different electrical characteristics, plate and filament excitation circuits connected to said sockets, an oscillating circuit connected across the plate and grid circuits of said sockets, a visual indicator consisting of a neon lamp connected in said oscillating circuit, an indicator bearing indicia indicative of the condition and positioned in front of the neon lamp for illumination by said lamp, and a slotted shield movable across said last named indicator with slots registerable with said indicia to expose but one at a time.

3. A vacuum tube tester comprising a plurality of sockets for tubes of different electrical characteristics, plate and filament excitation circuits connected to said sockets, an oscillating circuit connected across the plate and grid circuits of said sockets, a visual indicator consisting of a neon lamp connected in said oscillating circuit, an indicator bearing indicia indicative of the condition and positioned in front of the neon lamp for illumination by said lamp, and a slotted shield movable across said last named indicator with slots registerable with said indicia to expose but one at a time, the neon lamp having a variable resistance in shunt therewith and the shield being mounted for movement in synchronism with the operations for varying the resistance.

4. A vacuum tube tester comprising a plurality of sockets for tubes of different electrical characteristics, plate and filament excitation circuits connected to said sockets, an oscillating circuit connected across the plate and grid circuits of said sockets, a visual indicator consisting of a neon lamp connected in said oscillating circuit, an indicator bearing indicia indicative of the condition and positioned in front of the neon lamp for illumination by said lamp, and a slotted shield movable across said last named indicator with slots registerable with said indicia to expose but one at a time, the neon lamp having a variable resistance in shunt therewith and the shield being mounted for movement in synchronism with the operations for varying the resistance, the indicia being arranged in superposed arcuate lines and the slots in the shield having angular leads one over the other.

5. A vacuum tube tester comprising a plurality of sockets for tubes of different electrical characteristics, plate and filament excitation circuits connected to said sockets, an oscillating circuit connected across the plate and grid circuits of said sockets, a neon lamp connected in the oscillating circuit, a variable resistance for controlling the energy of the neon lamp, and a double-pole double-throw switch for shifting the neon lamp from the oscillating circuit to the plate excitation circuit and vice versa.

6. A vacuum tube tester comprising a plurality of sockets for tubes of different electrical characteristics, plate and filament excitation circuits connected to said sockets, an oscillating circuit connected across the plate and grid circuits of said sockets, a neon lamp connected in the oscillating circuit, a variable resistance for controlling the energy of the neon lamp, and a double-pole double-throw switch for shifting the neon lamp from the oscillating circuit to the plate excitation circuit and vice versa, the double-throw switch being operatively controlled with the variable resistance for automatic actuation in one of the two extreme positions of the movable element of the latter.

7. A vacuum tube tester comprising a plurality of sockets for tubes of different electrical characteristics, plate and filament excitation circuits connected to said sockets, an oscillating circuit connected across the plate and grid circuits of said sockets, a neon lamp and a serially connected capacity connected in the oscillating circuit, a variable resistance in shunt with the neon lamp, and a double-pole double-throw switch operatively connected with the movable element of the variable resistance to automatically shift the neon lamp from the oscillating circuit to the plate excitation circuit and vice versa.

8. A vacuum tube tester comprising a plurality of sockets for tubes of different electrical characteristics, plate and filament excitation circuits connected to said sockets, an oscillating circuit connected across the plate and grid circuits of said sockets, a neon lamp connected in said oscillating circuit, a variable resistance in shunt with the neon lamp to regulate the energy in the latter, and a double-pole double-throw switch operatively connected with the movable element of the variable resistance to throw the neon lamp across the plate excitation circuit when all of the resistance is in circuit but to shift the neon lamp to the oscillating circuit in intermediate positions of the movable element of the resistance.

CLAUDE E. URBAN.